Feb. 1, 1966

D. L. ENSLEY 3,232,120

CONVERGENT FIELD SUPPORTED INERTIAL REFERENCE

Filed July 29, 1963

DONALD LUTHER ENSLEY
INVENTOR.

BY D. Carl Richards

Feb. 1, 1966   D. L. ENSLEY   3,232,120
CONVERGENT FIELD SUPPORTED INERTIAL REFERENCE
Filed July 29, 1963   2 Sheets-Sheet 2

DONALD LUTHER ENSLEY
INVENTOR.

BY

3,232,120
CONVERGENT FIELD SUPPORTED
INERTIAL REFERENCE
Donald Luther Ensley, Hurst, Tex., assignor, by direct and mesne assignments, to Harvest Queen Mill & Elevator Company, Dallas, Tex., a corporation of Texas
Filed July 29, 1963, Ser. No. 298,199
11 Claims. (Cl. 73—505)

This application is a continuation-in-part of application Serial No. 113,546, filed May 29, 1961, now Patent No. 3,164,022, which in turn was a continuation-in-part of parent application Serial No. 778,673, filed December 8, 1958, now abandoned.

This invention relates to an inertial reference unit for sensing rotation about selected axes and more particularly to an inertial reference unit which is resiliently positioned by a convergent ultrasonic field.

In accordance with the disclosures of the above applications, a solid inertial reference element is placed in a flotation chamber. The flotation chamber is filled with a fluid having a specific gravity of the same order as the specific gravity of the reference element. For a rotational sensing system, the reference element is neutrally buoyant in the fluid. For an accelerometer device, the reference element is slightly buoyant, either positively or negatively. Transducer means in the chamber when excited produces an ultrasonic sound field within the flotation fluid. The reaction of the sound field with the surfaces of the reference element produces standing pressure waves of second order radiation within the flotation chamber. By directing the ultrasonic energy against diametrically opposed surfaces of the inertial element, the inertial element will seek an equilibrium position in the field and will be restrained resiliently at such equilibrium position by reason of the presence of pressure gradients in the sound field adjacent to the surfaces of the element. With such a system, the inertial element may be relatively small in size. The net torque on the reference element is very low in magnitude so that an extremely stable inertial reference element is thus made available.

The present invention is directed to an improvement over systems of the type disclosed in prior applications and more specifically, is directed to an inertial element which is resiliently supported in a flotation chamber in an ultrasonic sound field which is convergent. In accordance with a further aspect of the invention, a single inertial reference element is provided for sensing rotation about each of three mutually perpendicular axes.

In accordance with the invention, a piezoelectric body having a hollow cavity therein encloses a spherical reference element in the cavity. A transmission fluid fills the space in the cavity outside said element and has specific gravity substantially corresponding with the specific gravity of the element. Means are provided for applying an ultrasonic voltage to the body for generating ultrasonic waves in the cavity which are convergent toward the center. Means are provided for sensing rotation of the body relative to the element about a selected axis. In one form, gimbal means support the body for rotation about the above axis. The body is then slaved to the element with reference to rotation about the gimbal axis.

In a more specific aspect a piezoelectric body is provided, having a hollow spherical cavity and is formed of material of low acoustic impedance. A spherical inertial reference element is positioned within the cavity. The element is such as to permit passage therethrough of radiant energy in the light spectrum and is characterized by having optical asymmetry. A voltage in the range of the ultrasonic frequency band is applied to the piezoelectric body for generating pressure waves in the spherical cavity which are convergent toward the center of the cavity. A transmission medium confined within the cavity for flotation of the inertial reference element has a specific gravity the same as the specific gravity of the reference element. Means are provided for directing at least one light beam through the walls of said body and through said inertial element for sensing rotation of said body relative to the inertial element.

For a more complete understanding of the present invention, and for further objects and advantages thereof, reference may now be had to the following description taken in conjunction with the accompanying drawings in which.

Figure 1:
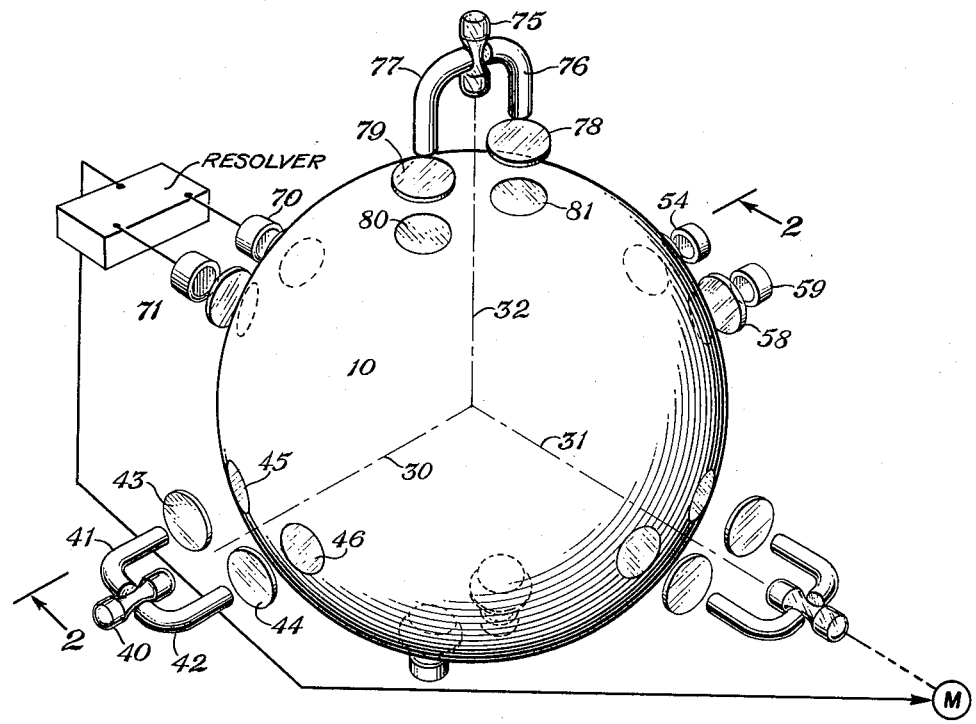
FIGURE 1 is a fragmentary perspective view in diagrammatic form of one embodiment of the present invention.
Figure 2:
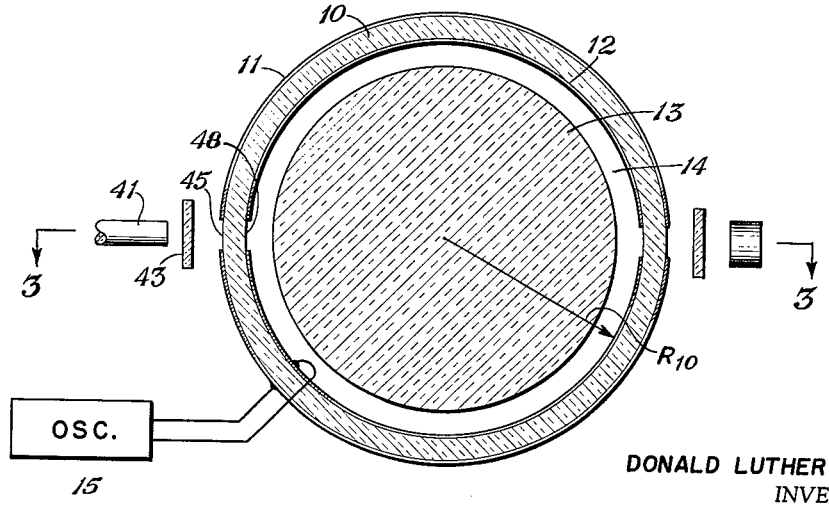
FIGURE 2 is a sectional view of the unit of FIGURE 1 taken along the line 2—2 of FIGURE 1.
Figure 3:
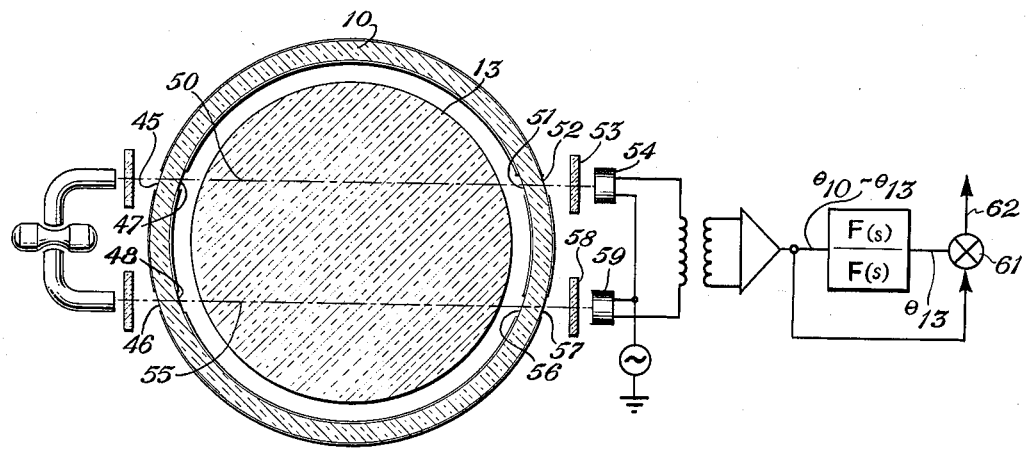
FIGURE 3 is a sectional view taken along the lines 3—3 of FIGURE 2.

Referring now to FIGURES 1 and 2, the inertial reference system is provided with an outer housing in the form of sphere 10. The sphere 10 is of piezoelectric material, preferably of low acoustic impedance. As best seen in FIGURE 2, the piezoelectric sphere 10 is provided with an outer conductive coating 11 and an inner conductive coating 12. Coatings 11 and 12 may be relatively thin films of a metallic conductor plated on the inside and outside of the sphere. Positioned inside the sphere is an inertial reference element 13. The reference element 13 is of spherical form. The element 13 is preferably neutrally buoyant in a fluid in the spherical zone 14 between the element 13 and the inner wall of the housing 10. As illustrated in FIGURE 2, an alternating current voltage is applied from a source 15 to the conductive films 11 and 12. The frequency of the output voltage from the source 15 preferably is in the ultrasonic frequency band. Upon excitation of the piezoelectric sphere, ultrasonic pressure waves are generated in the fluid in zone 14. Preferably, the inertial element 13 is made of material of high acoustic impedance. Further, the driver source 15 preferably has a low impedance compared to the alternating current impedance of the piezoelectric sphere 10. By reason of the reaction between the pressure waves converging toward the center of the sphere 10 and the surface of the element 13, standing pressure waves of second order radiation are established in the flotation fluid. The pressure gradients in the flotation fluid are of such a nature that the reference element will seek an equilibrium position symmetrically within the sphere 10, and will be resiliently restrained by the pressure field at such equilibrium position. However, at such position the inertial element 13 is free to rotate having unlimited rotational freedom. The only restraints placed upon the element 13 are the pressure gradients which prevent translation with respect to the walls of the sphere 10.

The operation of the system is based primarily upon the flotation of the inertial element 13 in the sphere 10 and the generation of a time average radiation pressure. It may readily be shown that the first order propagation equation for excitation of the sphere 10 is as follows:

$$C^2(\nabla^2 \phi) - \frac{\partial \phi}{\partial t^2} = 0 \text{ (Linear Response)} \quad (1)$$

where:

C is the phase velocity of the sound generated by sphere 10;

$\phi$ is the velocity potential of the sound field;

$\partial^2/\partial t^2$ is the second derivative with respect to time; and $\nabla$ is a differential operator.

The second order propagation may be shown to correspond with the following expression:

$$C^2(\nabla^2\phi) - \frac{\partial^2\phi}{\partial t^2} + \frac{\partial}{\partial t}(\nabla\phi)^2 - (n-1)\frac{\partial\phi}{\partial t}\nabla^2\phi = 0 \quad (2)$$

where:
$n$ is the power in the polytropic relationship between pressure and density $$\frac{P}{P_0} = \left(\frac{\rho}{\rho_0}\right)^n$$

with $P_0$ and $\rho_0$ being undisturbed pressure and density and $P$ and $\rho$ being reference presence and density.

From Equation 2, it can be shown that the time average radiation pressure $Pa$ is expressed by the following relationship:

$$Pa = \frac{\rho 0}{2}\left[\frac{1}{C^2}\overline{\left(\frac{\partial\phi}{\partial t}\right)^2} - \overline{(\nabla\phi)^2}\right] \quad (3)$$

where:
$\rho_0$ is the density of the undisturbed fluid in which the sound field is generated.

Figure 4:
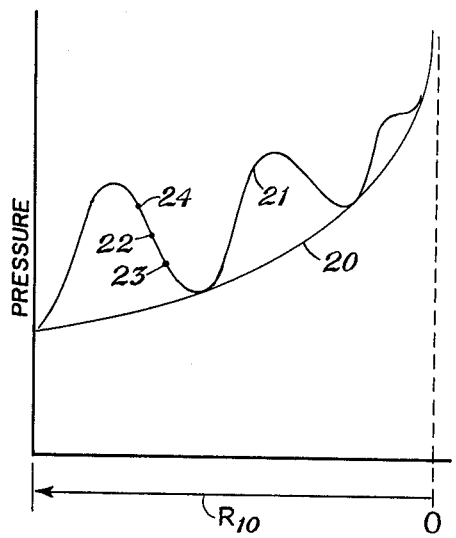
FIGURE 4 is a graph of pressure fields.

As illustrated in FIGURE 4, pressure in the sphere 10 is plotted as a function of the logarithm of the distance inward from the wall of the sphere 10. With sphere 10 filled with fluid, pressure waves converge toward the center of the sphere. The increase in pressure normally would follow the function indicated by the line 20. With the element 13 within the housing 10, standing pressure waves are produced in the flotation fluid by reason of the reaction of the inwardly directed ultrasonic waves with the confronting surfaces of the element 13. The standing wave pattern thus produced is indicated by the oscillatory function 21. The frequency of excitation and the dimensions of the sphere 10 and the inertial element 13 are such that the inertial element normally is positioned at a point in the pressure field represented by the point 22. Since the system is spherical, the sound field will be symmetrical within the housing 10 so that equal pressure will be exerted on the entire surface of the inertial element 13 at the level represented by the pressure at point 22. If the sphere 10 is accelerated in one direction tending to move relative to the element 13, then the pressure changes so that on the forward side of the inertial element, with reference to the direction of movement, the pressure would be lowered as to a point 23. At the same time, the pressure on the rear side would be increased as by movement to a pressure point represented by point 24. The asymmetry thus produced in the pressure gradient effective on the element 13 will force the element 13 to move with the housing 10. The restoring forces bring the element 13 back to the equilibrium position with reference to the housing. The forces are resilient and dynamic by reason of the very nature of the generation thereof. Thus the torques acting on the inertial element are minimal. At the same time, the positioning of the element 13 within the housing 10 is certain.

With the foregoing understanding of the operation of the system, it will be appreciated that the element 13 will be positioned in the sphere 10 at a predetermined position but is free to rotate. In order to sense the rotation about any given axis, a light sensing system may be employed. Preferably, the element 13 will be of high acoustic impedance material such as tourmaline or doped ruby, but in which the crystal employed is grown as to introduce optical asymmetries therein. By this means, rotation of the sphere 10 relative to element 13 will be detectable by the optical rotation of a polarized light beam projected through the element 13.

For sensing purposes, and as illustrated in FIGURE 1, sensing means are provided on each of the three axes 30, 31, and 32. On the axis 30, there is provided a light source 40 with a pair of optical light pipes 41 and 42 which direct beams of light through polarizing disks 43 and 44, respectively. The polarized light beams passing through disks 43 and 44 are projected through windows 45 and 46 in films 11 of the sphere 10. Similar windows 47 and 48 are provided through the inner film 12. Polarized light beam 50 passes from window 47 and through the reference element 13. It then passes through window 51 and window 52, through a polarized plate 53, to a photocell 54. The second light beam 55 passes through windows 46 and 48, element 13, windows 56 and 57, a polarizing plate 58, and then to a photocell 59.

The polarizing plates 43 and 44 have the optical axes thereof rotated one with respect to the other by a relatively small angle $\theta$ as seen in FIGURE 1. The optical axes of the plates 53 and 58 are rotated one with respect to another an angle $90°+\theta$ so that they are at right angles to the axes of the plates 43 and 44 respectively. Thus rotation of the sphere 10 on the axis 30, with the inertial element remaining fixed in inertial space, will cause variations in the voltage at the outputs of the cells 54 and 59 which are sinusoidal passing through a null for each 360° of optical rotation of the light beams 50 and 55 as they pass through the element 13.

It will be understood that by reason of the fluid coupling between the sphere 10 and the element 13, that rotation of the sphere 10 on axis 30 will also cause the element 13 to tend to follow it and cause rotation of the element 13 about axis 30. The drag or fluid coupling on the element 13 may, in accordance with one aspect of the invention, be accounted for by passing the signal from detectors 54 and 59 to a computer which has built into it the fluid coupling function or the transfer function of the flotation fluid between the sphere 10 and the element 13.

More particularly, the output function from the pick-off photocells 54 and 59 may be fed directly to a computer 60 which performs the function indicated, namely the ratio of $$\frac{F(s)}{1-F(s)}$$

The function $F(s)$ which represents the transfer function of the fluid coupling in Laplace Transform notation, may be identified as follows:

$$F(s) = \frac{C\sqrt{Ns}}{I_{13}s\left[1 - \frac{C}{I_{13}s}\left(1 - \frac{1}{r_{13}}\right)\right]}[AI_0(r_{13}\sqrt{Ns}) + BK_0(r_{13}\sqrt{Ns})] \quad (4)$$

where:
A, B and C are constants involving $r_{10}$ and $r_{13}$;
$s$ is a complex variable for the Laplace Transform;

$$N = \frac{\rho}{\mu}$$

$\rho$ is density of the fluid;
$\mu$ is the viscosity of the fluid;
$r_{13}$ is the radius of element 13;
$I_0$ is a modified Bessel function of the zero order;
$K_0$ is a modified Bessel function of the second kind of the zero order;
$r_{10}$ is the radius of chamber 10; and
$I_{13}$ is the moment of inertia of element 13.

The voltage from the pick-off unit which includes the photocells 54 and 59 is proportional to the difference between the angle of rotation of the sphere 10 and the angle which the element 13 sympathetically follows the rotation of the sphere 10 by reason of the fluid coupling. The output of the computer 60 is proportional to the rotation of the element 13. This function is then added to the output from the pick-off as in an adder 61, so that the function on the output channel 62 of the adder 61 is representative of the rotation of the sphere 10.

In the embodiment of FIGURE 1, an optical pick-off system is provided for each of the three axes. The photocells 70 and 71 represent the output portions of the pick-off system for the axis 31. The light source 75, light pipes 76, 77, optical polarizing plates 78, 79, and windows 80, 81, are portions of the pick-off system for the axis 32. A computer or rotation resolver circuit of the type provided for the pick-offs from axis 30 may be provided for each of the axes 31 and 32, so that the total motion of the sphere may be described by signals derived from the pick-offs on each of the three axes.

The foregoing description, wherein the computer 60 is employed, involves operation in which the sphere 10 is strapped down to a moving body, the motion of which is to be sensed. It will be appreciated that the sphere 10 may be a solid body, merely having a spherical internal cavity, with the solid body shaped such as to accommodate its being mounted in a gimbal system. Each pick-off unit may then be fed into a servo-loop in the manner well-known to those skilled in the art so that rotation about each axis may be fed back to a motor driving the gimbal structure at such axis to slave the reference element 13 to the sphere 10. Such an arrangement has been shown for the axis 31 of FIGURE 1, and while only one servo-loop is shown, each of three axes may be so implemented so that the sphere 10 will follow element 13. The Polaroid plates in each of the pick-offs may be so adjusted in their rotational position, that for an initial position of the inertial element 13, the output from each of the three pick-off systems will be a null. The three servo-loops responsive to the signals at each of the three axes 30–32 may then be closed tightly to slave the sphere 10 to the element 13 and thus eliminate, to all substantial degree, the effect of the fluid coupling between the sphere 10 and the element 13.

The system above described may be relativetly small so that it can be packaged for inclusion in systems demanding economy of weight. The element 13 may be of the order of one inch in diameter. A suitable flotation fluid may be a mixture of tetrabromo-ethane and m-bromo-toluene of such proportions that the specific gravity substantially matches the specific gravity of the reference element. The housing or hollow sphere 10 may be of either ethylene di-amine tartrate in which case the sensing means would include a detector means responsive to ultra-violet light or the sphere 10 may be of di-hydrogen phosphate in which case the sensing means would include a detector responsive to infra-red light. The frequency of operation preferably will be of the range from about one-half to about 10 megacycles per second. The reference element 13 may thus be restrained resiliently in ultrasonic pressure waves which converge toward the center of the cavity. The pick-off means is provided for sensing the rotation of the outer shell relative to the inertial element. In the strap-down embodiment, the fluid coupling function is accommodated in the readout system to provide an indication representative of the rotation of the outer shell on each of three axes. In the gimbal mounted system, the outer sphere is slaved to the element 13 to require it to follow element 13.

Having described the invention in connection with certain specific embodiments thereof, it is to be understood that further modifications may now suggest themselves to those skilled in the art, and it is intended to cover such modifications as fall within the scope of the appended claims.

What is claimed is:

1. An inertial reference system which comprises
   (a) a piezoelectric body having a spherical cavity therein,
   (b) a spherical reference element in said cavity,
   (c) means for applying an alternating voltage to said body for the generation of ultrasonic waves in said cavity which converge toward the center of said cavity,
   (d) a transmission fluid filling the space in said cavity outside said element having a specific gravity substantially corresponding with the specific gravity of said element, and
   (e) means for sensing rotation of said body relative to said element.

2. The combination set forth in claim 1 in which the sensing means includes source means and polarizing means for each of two paths extending through said body and said reference element on opposite sides of an axis with respect to which rotation of said housing is to be sensed.

3. The combination set forth in claim 1 in which three sensing means are provided one for each of three mutually perpendicular axes.

4. An inertial reference system which comprises:
   (a) a piezoelectric body having a spherical cavity therein,
   (b) a spherical reference element in said cavity having optical asymmetry and adapted for the passage of light therethrough,
   (c) means for applying an alternating voltage to said body for the generation of acoustic waves in said cavity which converge toward the center of said cavity,
   (d) an acoustic transmission fluid confined within said cavity having a specific gravity substantially corresponding with the specific gravity of said element and whose density is dependent upon pressure therein, and
   (e) means directed along at least one light path extending through said body and said reference element for sensing relative rotation of said body relative to said reference element.

5. An inertial reference system which comprises:
   (a) a piezoelectric body of material of low acoustic impedance having a spherical cavity therein,
   (b) a spherical reference element in said cavity of high acoustic impedance having optical asymmetry and adapted for the passage of light therethrough,
   (c) means for applying an alternating voltage to said body for the generation of acoustic waves in said cavity which are convergent at the center of said cavity,
   (d) an acoustic transmission fluid confined within said cavity having specific gravity substantially corresponding with the specific gravity of said element and characterized by density thereof being dependent upon pressure therein, and
   (e) means directed along at least one light path extending through said body and said reference element for sensing relative rotation of said body relative to said reference element.

6. The combination set forth in claim 5 in which said reference element is tourmaline grown as to introduce optical asymmetry.

7. The combination set forth in claim 5 in which said reference element is doped ruby grown as to introduce optical asymmetry.

8. The combination set forth in claim 5 in which said body is a hollow sphere of ethylene di-amine tartrate and in which the sensing means includes detector means responsive to ultra-violet light.

9. The combination set forth in claim 5 in which said body is a hollow sphere of di-hydrogen phosphate and in which the sensing means includes detector means responsive to infra-red light.

10. An inertial reference system which comprises:
    (a) a piezoelectric body having a hollow cavity therein,
    (b) a spherical reference element in said cavity,
    (c) a transmission fluid filling the space in said cavity outside said element having specific gravity substantially corresponding with the specific gravity of said element,
    (d) means for applying alternating voltage to said body for generation of ultrasonic waves in said cavity which are convergent toward the center of said cavity to position said element, (e) means for sensing rotation of said body relative to said element about a selected axis,
(f) gimbal means supporting said body for rotation about said axis, and
(g) means for slaving said body to said element with reference to rotation about said axis.

11. An inertial reference system which comprises:
(a) a piezoelectric body having a hollow cavity therein,
(b) a spherical reference element in said cavity,
(c) a transmission fluid filling the space in said cavity outside said element having specific gravity substantially corresponding with the specific gravity of said element,
(d) means for applying alternating voltage to said body for generation of ultrasonic waves in said cavity which are convergent toward the center of said cavity to position said element,
(e) means for sensing rotation of said body relative to said element about selected axes,
(f) gimbal means supporting said body for independent rotation about said axes, and
(g) means for slaving said body to said element with reference to rotation about said axes.

References Cited by the Examiner
UNITED STATES PATENTS

| | | | |
|---|---|---|---|
| 3,003,356 | 10/1961 | Nordsieck | 73—517 |
| 3,056,303 | 10/1962 | Naylor | 73—516 |

RICHARD C. QUEISSER, *Primary Examiner.*

JAMES J. GILL, *Examiner.*